US006850275B1

(12) United States Patent
Minakami

(10) Patent No.: US 6,850,275 B1
(45) Date of Patent: Feb. 1, 2005

(54) EDGE CORRECTION APPARATUS FOR DIGITAL VIDEO CAMERA

(75) Inventor: Tetsuya Minakami, Tokyo (JP)

(73) Assignee: NEC Corporation, Tokyo (JP)

(*) Notice: Subject to any disclaimer, the term of this patent is extended or adjusted under 35 U.S.C. 154(b) by 850 days.

(21) Appl. No.: 09/588,353

(22) Filed: Jun. 7, 2000

(30) Foreign Application Priority Data

Jun. 8, 1999 (JP) .......................................... 11/161700

(51) Int. Cl.⁷ ............................................ H04N 5/208
(52) U.S. Cl. ...................... 348/252; 348/253; 348/625; 382/266
(58) Field of Search .............................. 348/625, 628, 348/629, 631, 252, 253; 382/266

(56) References Cited

U.S. PATENT DOCUMENTS

| | | | | |
|---|---|---|---|---|
| 4,962,419 A | * | 10/1990 | Hibbard et al. | 348/627 |
| 5,432,563 A | * | 7/1995 | Kasahara | 348/629 |
| 5,555,023 A | * | 9/1996 | Maenaka et al. | 348/253 |
| 5,838,371 A | * | 11/1998 | Hirose et al. | 348/240.2 |

FOREIGN PATENT DOCUMENTS

| JP | 6-14190 | 1/1994 |
|---|---|---|
| JP | 06-088502 | 4/1994 |
| JP | 8-111791 | 4/1996 |
| JP | 08-173841 | 7/1996 |
| JP | 9-261 | 5/1997 |

OTHER PUBLICATIONS

T. Akihiro, "Digital Signal Processing For Consumer–Use Single–CCD Video Cameras", ITEJ Technical Report, Jan. 25, 1991.
Japanese Office Action dated Dec. 4, 2001; English Translation of Japanese Examiner's reason for rejection.

* cited by examiner

Primary Examiner—Andrew Christensen
Assistant Examiner—Brian Genco
(74) Attorney, Agent, or Firm—Whitman, Curtis & Christofferson, P.C.

(57) ABSTRACT

An edge correction apparatus for a digital video camera includes horizontal and vertical edge signal generators, horizontal and vertical edge signal gain controllers, an adder, a slice processor, and a vertical edge component suppression position detector. The horizontal and vertical edge signal generators respectively generate horizontal and vertical edge correction signals in the horizontal and vertical directions of a sensed image obtained via the image sensing element of a digital video camera. The horizontal and vertical edge signal gain controllers control the gains of the horizontal and vertical edge correction signals. The adder adds the horizontal and vertical edge correction signals whose gains are controlled. The slice processor adds, to the image processing signal of the digital video camera, an edge correction signal obtained by performing slice processing for an edge signal output from the adder. The vertical edge component suppression position detector causes the vertical edge signal gain controller to execute gain control of the vertical edge correction signal in accordance with a horizontal difference signal output from the horizontal edge signal generator.

5 Claims, 12 Drawing Sheets

| 0 G | 0 B | 0 G | 255 B | 255 G |
|---|---|---|---|---|
| 0 R | 0 G | 0 R | 255 G | 255 R |
| 0 G | 0 B | 0 G | 255 B | 255 G |
| 0 R | 0 G | 0 R | 255 G | 255 R |
| 0 G | 0 B | 0 G | 255 B | 255 G |

FIG.6
PRIOR ART

| 0 G | 0 B | -128 G | -128 B | 0 G |
|---|---|---|---|---|
| 0 R | 0 G | 64 R | 64 G | 0 R |
| 0 G | 0 B | -128 G | -128 B | 0 G |
| 0 R | 0 G | 64 R | 64 G | 0 R |
| 0 G | 0 B | -128 G | -128 B | 0 G |

EDGE CORRECTION APPARATUS FOR DIGITAL VIDEO CAMERA

BACKGROUND OF THE INVENTION

1. Field of the Invention

The present invention relates to an edge correction apparatus for a digital video camera and, more particularly, to an edge correction apparatus for a digital video camera that can sharpen an image without degrading the image quality.

2. Description of the Prior Art

Edge correction apparatuses for conventional digital camera systems are disclosed in, e.g., Japanese Unexamined Patent Publication No. 6-14190, Japanese Unexamined Utility Model Publication No. 9-261, and "Digital Signal Processing for Single-CCD Video Camera", ITE Technical Report, Vol. 15, No. 7. FIG. 1 is a block diagram showing the arrangement of a part related to edge correction of a conventional CCD digital video camera having a general primary color Bayer layout color filter as shown in FIG. 2. Respective squares in FIG. 2 represent pixels, and letters "R", "G", and "B" mean the colors of color filters on corresponding pixels. Note that R means a red filter; G, a green filter; and B, a blue filter. Figures in some pixels are used to identify the positions of respective pixels for the following description.

In FIG. 1, an image projected on an image sensing element 101 via a lens is photoelectrically converted into a signal current within the image sensing element. The signal current is converted from an analog signal into a digital signal via an A/D converter 102, and undergoes various processes in order to obtain a normal natural image. First, the digital signal is subjected to processing of making the black level of an image uniform by an OB clamping processor 103, and then separated into R, G, and B color signals by a color separation processor 104. This color separation processing will be described. In color separation processing, arithmetic processing using convolution filters as represented by the following equations (1) to (5) is done for pixel positions on arbitrary 3 columns×3 rows. The arithmetic operations are switched in accordance with which of R, G, and B pixel positions corresponds to a target pixel.

$$a = \begin{bmatrix} 0 & 0 & 0 \\ 0 & 1 & 0 \\ 0 & 0 & 0 \end{bmatrix} \quad (1)$$

$$b = \frac{1}{2}\begin{bmatrix} 0 & 1 & 0 \\ 0 & 0 & 0 \\ 0 & 1 & 0 \end{bmatrix} \quad (2)$$

$$c = \frac{1}{2}\begin{bmatrix} 0 & 0 & 0 \\ 1 & 0 & 1 \\ 0 & 0 & 0 \end{bmatrix} \quad (3)$$

$$d = \frac{1}{4}\begin{bmatrix} 1 & 0 & 1 \\ 0 & 0 & 0 \\ 1 & 0 & 1 \end{bmatrix} \quad (4)$$

$$e = \frac{1}{4}\begin{bmatrix} 0 & 1 & 0 \\ 1 & 0 & 1 \\ 0 & 1 & 0 \end{bmatrix} \quad (5)$$

When the color of a pixel processed at given time during color signal processing is R, equations (1) to (5) yield:

R output: arithmetic result of equation (1)
G output: arithmetic result of equation (5)
B output: arithmetic result of equation (4)
When the color is G on a GR line,
R output: arithmetic result of equation (3)
G output: arithmetic result of equation (1)
B output: arithmetic result of equation (2)
When the color is G on a GB line,
R output: arithmetic result of equation (2)
G output: arithmetic result of equation (1)
B output: arithmetic result of equation (3)
When the color is B,
R output: arithmetic result of equation (4)
G output: arithmetic result of equation (5)
B output: arithmetic result of equation (1)

In color separation processing, an arbitrary pixel on the screen is arithmetically processed with pixels on immediately preceding and subsequent lines. For this purpose, two delay lines 115 and 116 are generally required to delay a pixel signal by one horizontal period. Recently, these delay lines 115 and 116 are generally formed from FIFO (First-In First-Out) memories. After color separation processing, color correction processing (matrix processing) is executed by a color correction processor 105 in order to make the spectral characteristics of an image signal mainly determined by a color filter attached to the image sensing element 101 match NTSC standard spectral characteristics. Further, various processes are performed: white balance processing by a white balance processor 106; gamma processing by a gamma processor 107 for making the characteristics of an image signal match the display characteristics of a cathode-ray tube for displaying an image; and clipping processing by a white/black clipping processor 108 for cutting the upper and lower limits of an image signal at predetermined values. As a result, a video signal is formed.

Reference numeral 121 denotes an edge correction processing means. The function of this edge correction processing means 121 will be described in detail below. Processing by the edge correction processing means 121 is necessary to emphasize the sharpness of an output image and compensate for response degradation of the optical system and image sensing device. The horizontal and vertical edge signals of an image are extracted, and multiplied by constants, respectively. The products are added to the original signal to emphasize the edge component of the image, thereby increasing the sharpness.

To downsize the circuit and simplify processing, an edge signal is generated by an out-of-green method using only a green signal approximately regarded as a luminance signal and green signals obtained by delaying the luminance signal by one horizontal line and two horizontal lines. For the same reason, processing by the edge correction processing means 121 is divided into horizontal edge correction processing of emphasizing and correcting the horizontal edge component of an image and vertical edge correction processing of emphasizing and correcting the vertical edge component. In FIG. 1, input signals to the edge correction processing means 121 are a green signal G0 output from the color separation processor 104, and green signals G1 and G2 obtained by delaying the green signal G0 by one horizontal line and two horizontal lines, respectively. An output signal from the edge correction processing means 121 is obtained as an edge correction output d, which is added by adders 122, 123, and 124 with main processing signals having undergone white balance processing.

The respective functional blocks of the edge correction processing means 121 in FIG. 1 will be explained. In the edge correction processing means 121, a horizontal edge signal generator 109 performs horizontal edge processing, and a vertical edge signal generator 111 performs vertical edge processing. Horizontal and vertical edge signal gain controllers 110 and 112 control the gains of outputs from the generators 109 and 111. An adder 117 adds the gain-adjusted edge signal outputs, a gain controller 113 controls the gain of the whole edge signal, and a slice processor 114 executes slice processing for the control signal. In slice processing, a generated edge signal is cut at a predetermined level or less because a small-amplitude portion is mainly occupied by a noise component to decrease the S/N ratio.

The operations of the horizontal and vertical edge signal generators 109 and 111 as the most important processing items of edge correction processing will be explained in detail. A horizontal edge signal is generally generated by arithmetic processing between horizontally adjacent pixel components on a screen using the color-separated green signal G1. This is shown in FIG. 3. In FIG. 3, reference numerals 21 and 22 denote flip-flops (FF) for holding a pixel signal during one pixel period. The flip-flops 21 and 22 are used to perform the following arithmetic processing between pixel signals. That is, the green output G1 from the color separation processor 104 is input to a multiplier 23 and the flip-flop 21.

An output from the flip-flop 21 is input to a multiplier 24 and the flip-flop 22. An output from the flip-flop 22 is input to a multiplier 25. The multipliers 23, 24, and 25 multiply the outputs by coefficients of −1, 2, and −1, respectively. After outputs C1, C2, and C3 from the multipliers 23, 24, and 25 are added by an adder 26, the sum is output as a horizontal edge signal a via a 1/2-level shift circuit 27. This arithmetic processing is given by the following equation. Letting G02 be a signal delayed by one pixel from the signal G01 of a given pixel on the screen, and G03 be a signal delayed by two pixels, a horizontal edge signal Gh_dtl is given by $$Gh\_dtl = 1/2(-G01 + 2 \times G02 - G03) \qquad (6)$$

On the other hand, a vertical edge signal is generated by arithmetic processing between vertically adjacent pixel components in the frame using the green signals G1 and G2 obtained by delaying the green signal G0 by one horizontal period and two horizontal periods, respectively. This is shown in FIG. 4. In general, the green signals G1 and G2 are simultaneously generated by the color separation processor 104. In practice, the green signals G1 and G2 are extracted as two green signal outputs G0+G2 and G1, which are generally used for vertical edge processing. Note that FIG. 1 separately shows the green signals G0, G1, and G2.

When the color of a pixel processed at given time during color signal processing is R or B, the color separation processor 104 outputs these green signals G0, G1, and G2 as G0+G2: arithmetic result of equation (2)

G1: arithmetic result of equation (3)

When the color is G,

G0+G2: arithmetic result of equation (4)

G1: arithmetic result of equation (1)

Using these green signals G0, G1, and G2, the following arithmetic processing between pixel signals is executed. The green signals G0, G1, and G2 are respectively input to multipliers 31, 32, and 33, and multiplied by coefficients of −1, 2, and −1. After outputs C4, C5, and C6 from the multipliers 31, 32, and 33 are added by an adder 34, the sum is obtained as a vertical edge signal b via a 1/2-level shift circuit 35. This arithmetic processing is given by the following equation. Letting G05 be a signal delayed by one horizontal period from the signal G04 of a target pixel, and G06 be a signal delayed by two horizontal periods, a vertical edge signal Gv_dtl is given by $$Gv\_dtl = 1/2(-G04 + 2 \times G05 - G06) \qquad (7)$$

After that, the gains of the horizontal and vertical edge signals are properly changed and added to attain a final edge signal. Note that each arithmetic processing may be done not only between three adjacent pixels, but also between five or seven adjacent pixels to form an edge signal.

Letting G(n) be the output value of a green signal at a pixel position n in a CCD digital video camera system having a primary color Bayer layout color filter as shown in FIG. 2, a vertical edge signal Dtlv(5) at pixel position 5 in FIG. 2 corresponding to a green color filter is given from the above description and equations (1) to (7):

$$Dtlv(5) = G(5) - 1/2(G(2) + G(8)) = G(5) - 1/2(1/2(G(1) + G(3)) + 1/2(G(7) + G(9))) = G(5) - 1/4(G(1) + G(3) + G(7) + G(9)) \qquad (8)$$

This equation similarly applies to pixel positions 1, 3, 7, 9, and 11 as pixel positions corresponding to other green color filters except that the relative positions of corresponding pixels in equation (8) shift.

A vertical edge signal Dtlv(8) at pixel position 8 in FIG. 2 corresponding to a red color filter is given from the above description and equations (1) to (7):

$$Dtlv(8) = G(8) - 1/2(G(5) + G(11)) = 1/4(G(5) + G(7) + G(9) + G(11)) - 1/2(G(5) + G(11)) = 1/4((G(7) + G(9)) - (G(5) + G(11))) \qquad (9)$$

This equation similarly applies to pixel position 2 as a pixel position corresponding to another red color filter except that the relative position of a corresponding pixel in equation (9) shifts. Equation (8) similarly applies to pixel positions 4, 6, 10, and 12 as pixel positions corresponding to other blue color filters except that the relative positions of corresponding pixels in equation (8) shift.

FIG. 5 is a view showing an example of a CCD direct output value before color separation processing when the color filter is attached to a CCD having a primary color Bayer layout. Respective squares in FIG. 5 represent pixels as in FIG. 2, and figures in these squares indicate the output values of respective pixels. In this case, the output value range is 8 bits, which are represented by an integer of 0 to 255. In FIG. 5, pixel outputs on the left side with respect to a certain vertical boundary have a minimum value of 0, and pixel outputs on the right side have a maximum value of 255. FIG. 6 is a view showing an output value when a vertical edge signal is generated from signals having values shown in FIG. 5 by processing given by equations (8) and (9). At this time, the vertical edge signal takes a positive/negative value. For an 8-bit input signal, the signal range is 9 bits, which are represented by an integer of −256 to 255.

The edge correction apparatus for the conventional CCD digital video camera operates in combination with the color separation processor 104. When the output difference between pixels is 0 in the vertical direction, but the difference in output value between horizontally adjacent pixels is large, as shown in FIGS. 5 and 6, an edge signal which should not exist vertically is generated by processing given by equations (8) and (9) though the output values of respective pixels in FIG. 6 are ideally 0. This problem arises in another situation, in addition to the case in which the output difference between pixels is very large, as shown in FIG. 5. However, this problem does not occur for a television signal whose three primary colors match with each other.

SUMMARY OF THE INVENTION

The present invention has been made to overcome the conventional drawbacks, and has as its object to provide an edge correction apparatus for a digital video camera that can suppress an unwanted vertical edge correction signal generated when the output difference between pixels is small in the vertical direction but the output difference between horizontally adjacent pixels is large, and thus can sharpen an image without degrading the image quality.

To achieve the above object, according to the main aspect of the present invention, there is provided an edge correction apparatus for a digital video camera, comprising a horizontal edge signal generator and a vertical edge signal generator for respectively generating horizontal and vertical edge correction signals in horizontal and vertical directions of a sensed image obtained via an image sensing element of a digital video camera, a horizontal edge signal gain controller and a vertical edge signal gain controller for controlling gains of the horizontal and vertical edge correction signals respectively from the horizontal edge signal generator and the vertical edge signal generator, an adder for adding the horizontal and vertical edge correction signals whose gains are controlled by the horizontal edge signal gain controller and the vertical edge signal gain controller, a slice processor for adding, to an image processing signal of the digital video camera, an edge correction signal obtained by performing slice processing for an edge signal output from the adder, and a vertical edge component suppression position detector for causing the vertical edge signal gain controller to execute gain control of the vertical edge correction signal in accordance with a horizontal difference signal output from the horizontal edge signal generator.

The horizontal difference signal in the main aspect includes the following signals:
 (a) a signal corresponding to the luminance difference between horizontally adjacent pixels that is output from the horizontal edge signal generator;
 (b) a signal corresponding to the output difference in green signal between horizontally adjacent pixels that is output from the horizontal edge signal generator;
 (c) a signal corresponding to the luminance difference between horizontally adjacent pixels that is output from the horizontal edge signal generator and the difference between digital video camera CCD output signals vertically adjacent at the same pixel position; and
 (d) a signal corresponding to the output difference in green signal between horizontally adjacent pixels that is output from the horizontal edge signal generator and the difference between digital video camera CCD output signals vertically adjacent at the same pixel position Gain control of the vertical edge correction signal by the vertical edge signal gain controller in the main aspect is executed under the following conditions:
 (A) the amplitude of the horizontal difference signal exceeds a set threshold;
 (B) the luminance difference between horizontally adjacent pixels is not less than a set threshold;
 (C) the output difference in green signal between horizontally adjacent pixels is not less than a set threshold;
 (D) the luminance difference between horizontally adjacent pixels is not less than a set threshold, and the outputs of vertically adjacent digital video camera CCD output signals are not more than the set threshold; and
 (E) the output difference in green signal between horizontally adjacent pixels is not less than a set threshold, and the difference between vertically adjacent digital video camera CCD output signals is not more than the set threshold.

As is apparent from these aspects, the present invention adopts the vertical edge component suppression position detector, and executes gain control of the vertical edge correction signal by the vertical edge signal gain controller in accordance with the horizontal difference signal output from the horizontal edge signal generator. The present invention can implement an edge correction circuit which can suppress an unwanted vertical edge correction signal generated when the output difference between pixels is small in the vertical direction but the output difference between horizontally adjacent pixels is large, and as a result, does not degrade the image quality.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 6 is an output distribution view showing a vertical edge correction output value obtained by correcting the CCD direct output value shown in FIG. 5;

DETAILED DESCRIPTION OF THE PREFERRED EMBODIMENTS

Several preferred embodiments of the present invention will be described in detail below with reference to the accompanying drawings.

Figure 1:
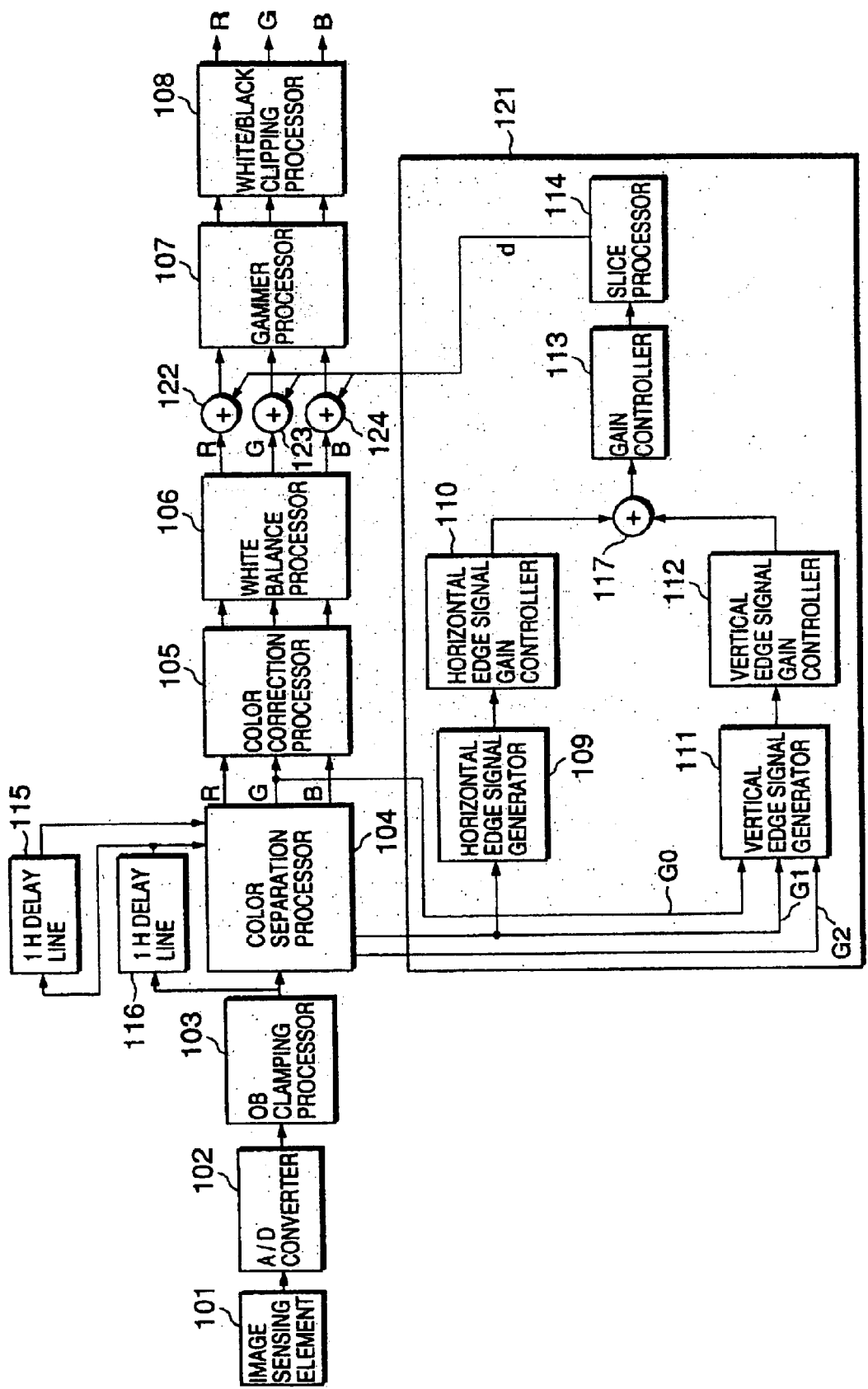
FIG. 1 is a block diagram showing an arrangement of a part related to edge correction of a conventional CCD digital video camera.
Figure 2:
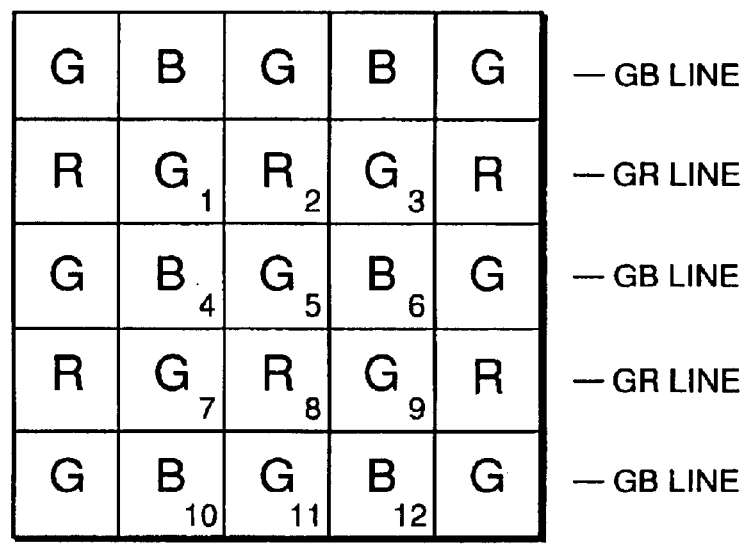
FIG. 2 is a view showing the color layout of a primary color Bayer layout color filter in the digital video camera shown in FIG. 1.
Figure 3:
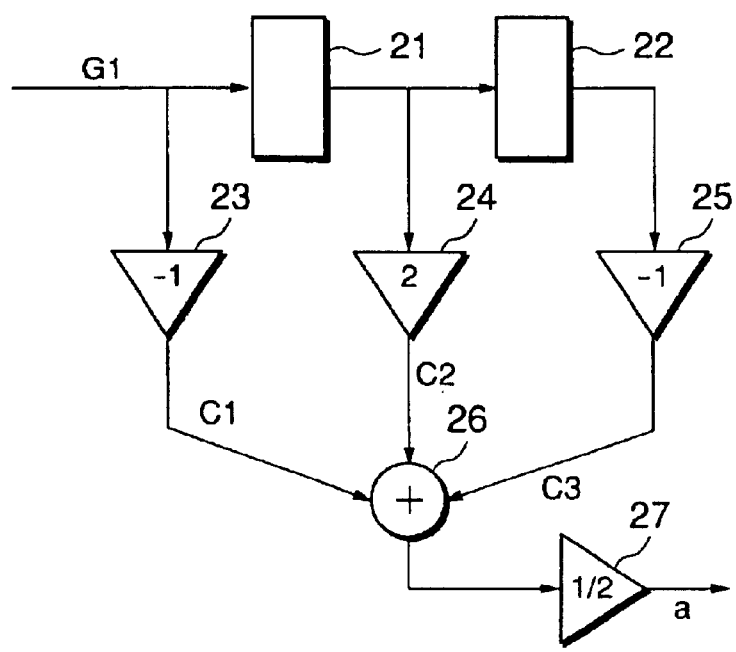
FIG. 3 is a block diagram showing the arrangement of a horizontal edge signal generator shown in FIG. 1.
Figures 4, 5:
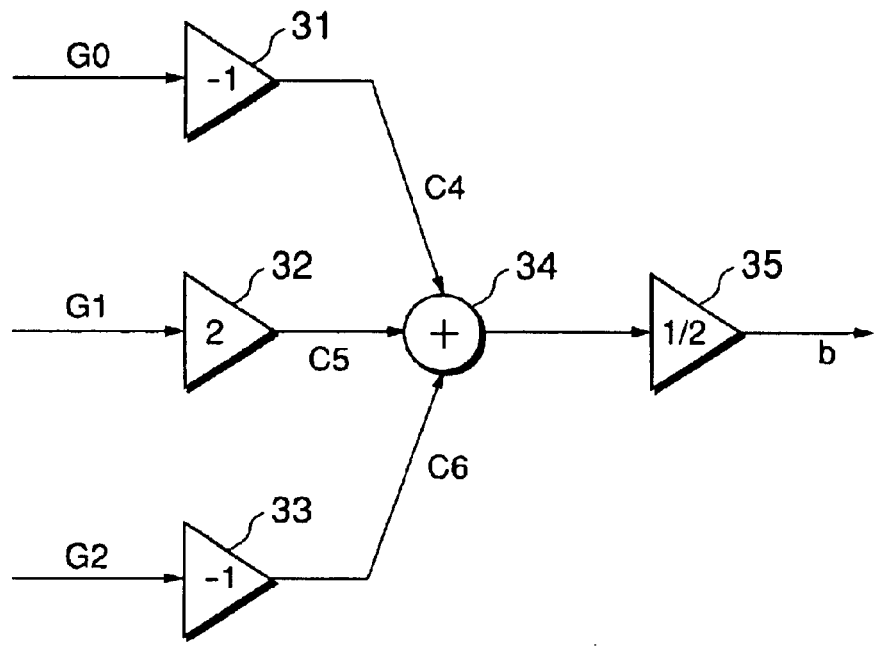
FIG. 4 is a block diagram showing the arrangement of a vertical edge signal generator shown in FIG. 1.
FIG. 5 is an output distribution view showing the CCD direct output value of an image sensing element shown in FIG. 1.
Figure 7:
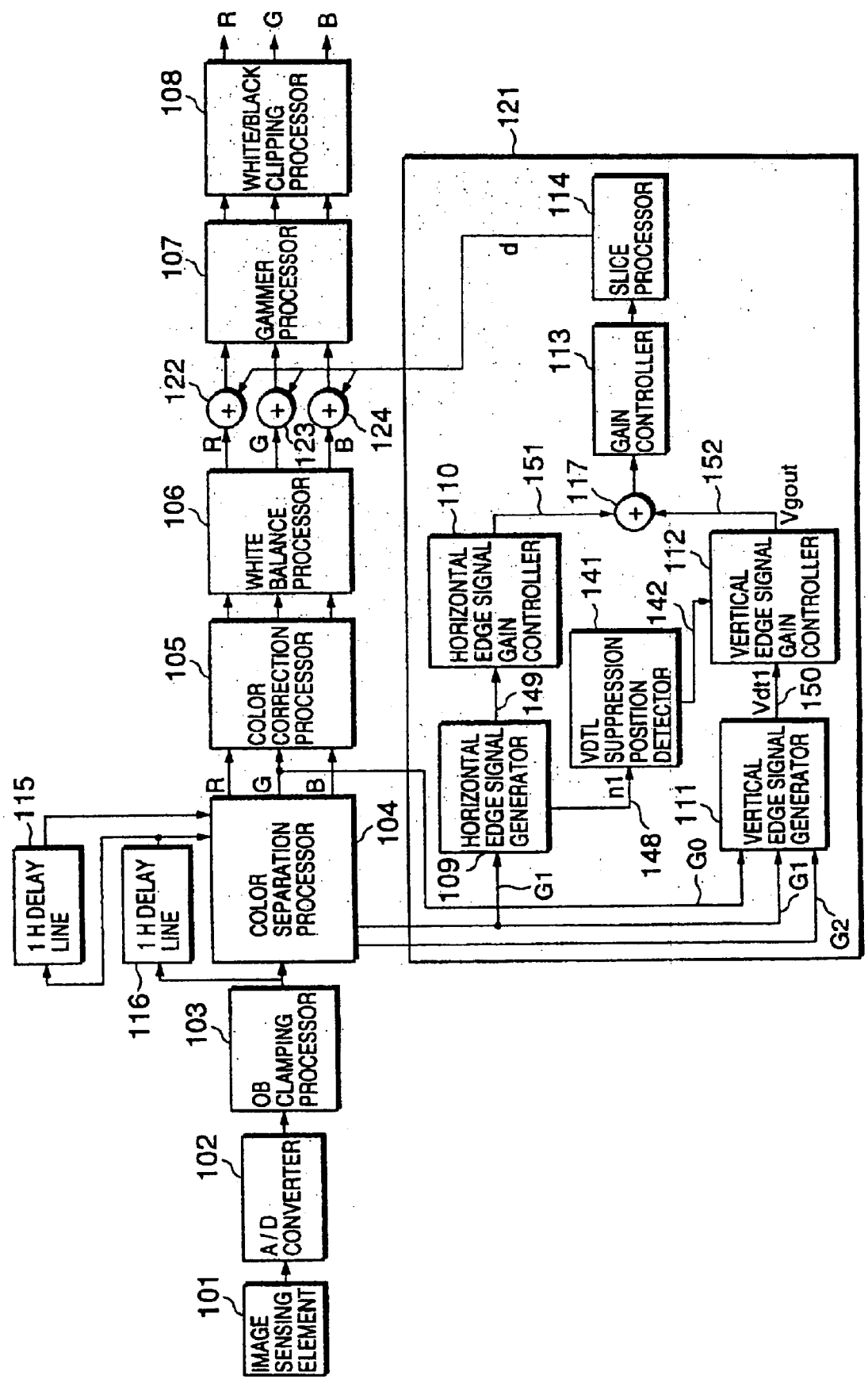
FIG. 7 is a block diagram showing an arrangement of a part related to edge correction of a CCD digital video camera according to the first embodiment of the present invention.

FIG. 7 is a block diagram showing an edge correction apparatus for a digital video camera according to the first embodiment of the present invention. The edge correction apparatus show in FIG. 7 is different from the conventional apparatus shown in FIG. 1 in that an edge correction processing means 121 contains a vertical edge component suppression position detector 141. In this digital video camera, as described in "DESCRIPTION OF THE PRIOR ART", an analog video signal output from an image sensing element 101 is converted into a digital signal by an A/D converter 102, subjected to OB clamping processing, and separated into red, blue, and green signals by a color separation processor 104. Since arithmetic processes given by equations (1) to (5) are required, color processing is done using an image signal having undergone OB clamping processing and image signals obtained by delaying this image signal by one horizontal line and two horizontal lines by 1H delay lines 115 and 116. This is a color separation method generally called 3-line processing. For green, green signals G1 and G2 are generated which are respectively delayed by one horizontal line and two horizontal lines so as to be used for vertical edge correction processing by a vertical edge signal generator 111. This generation method is the same as the conventional method.

Figure 8:
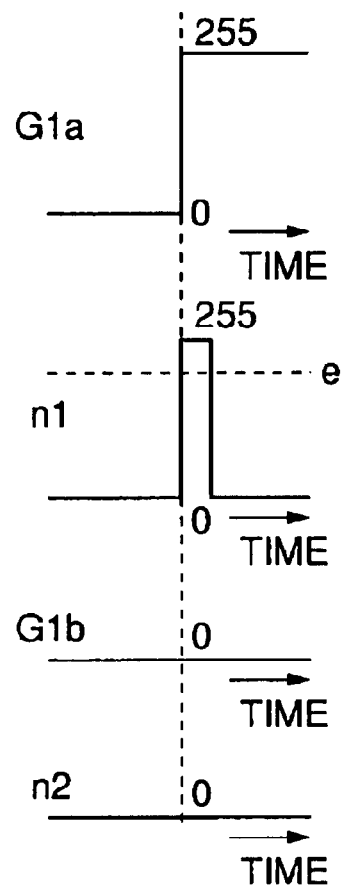
FIG. 8 is a waveform chart showing input and output signals to and from a horizontal edge signal generator shown in FIG. 7.

In the edge correction processing means 121, a horizontal edge signal generator 109 generates a horizontal edge correction signal 149, and a horizontal difference signal 148 representing the difference in luminance or green signal between two adjacent pixels. FIG. 8 shows waveforms G1a and G1b of the signal G1 input to the horizontal edge signal generator 109, and waveforms n1 and n2 of the horizontal difference signal 148 output from the horizontal edge signal generator 109. When the waveform of an input green signal abruptly changes, like the waveform G1a in FIG. 8, the horizontal difference signal 148 has a waveform with a peak, like the waveform n1. When the waveform of an input green signal is flat, like the waveform G1b in FIG. 8, the horizontal difference signal 148 also has a flat waveform, like the waveform n2. In FIG. 8, an output value given to each waveform is merely an example, and the output value can take various values with the same waveform.

If the amplitude of the waveform n1 of the horizontal difference signal 148 exceeds a certain threshold e, as shown in FIG. 8, the vertical edge component (VDTL) suppression position detector 141 generates a vertical edge signal gain control signal 142, and outputs it to a vertical edge signal gain controller 112. Since an unwanted vertical edge signal is generated at a position corresponding to the same pixel, as described in "DESCRIPTION OF THE PRIOR ART", this signal is suppressed by the vertical edge signal gain controller 112 to some degree so as not to be recognized as noise on the screen. The suppression degree depends on the amplitude (DS) of the horizontal difference signal 148. As the amplitude exceeds the threshold e much more, the unwanted signal is suppressed more strongly.

An example of this relationship is given by the following equations. Letting n1 be the horizontal difference signal 148, and K1 be a coefficient used in the vertical edge component suppression position detector 141, C1 which is a vertical edge signal gain control signal 142 is generated at the suppression position of a vertical edge signal, and given as follows:

If DS>e, $$C1 = K1 \cdot (n1 - e) \tag{10}$$

If DS<e, $$C1 = 0 \tag{11}$$

Figure 9:
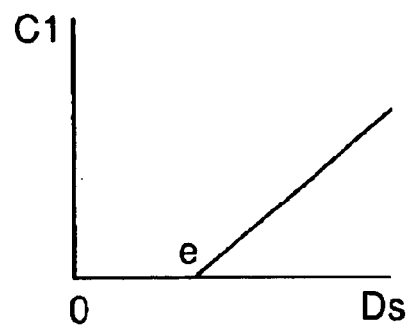
FIGS. 9 and 10 are graphs each showing a vertical edge signal gain control signal with respect to a horizontal difference signal shown in FIG. 7.
Figure 10:
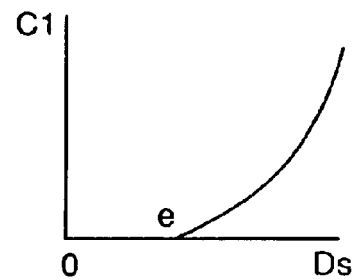

A graph representing this relationship is shown in FIG. 9. In this case, the coefficient K1 is a constant value determined under limitations on the signal bit width of the circuit, and equations (10) and (11) exhibit linear relations. Alternatively, as shown in the graph of FIG. 10, the coefficient K1 may change depending on the magnitude of a generated unwanted vertical edge signal, and may provide a curved relationship. The threshold e can be arbitrarily set.

Letting Vdtl be an output 150 from the vertical edge signal generator 111, Vgout be an output 152 from the vertical edge signal gain controller 112, and Ks be a coefficient used in the vertical edge signal gain controller 112, Vgout is given by $$Vgout = Vdtl(1 - Ks \cdot K1 \cdot (n1 - e)) \tag{12}$$

Figure 11:
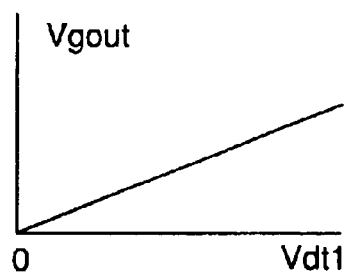
FIGS. 11 and 12 are graphs each showing the relationship between the input and output of a vertical edge signal gain controller shown in FIG. 7.
Figure 12:
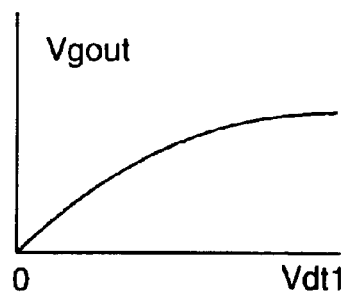

FIG. 11 shows the relationship between Vdtl and Vgout when the coefficient Ks is constant, and n1 serving as the horizontal difference signal 148 is also constant. As described above, the horizontal difference signal n1 originally changes depending on the difference in output value between horizontally adjacent pixels. This coefficient Ks is determined under limitations on the signal bit width of the circuit. Alternatively, as shown in the graph of FIG. 12, the coefficient Ks may change depending on the magnitude of a generated unwanted vertical edge signal, and may provide a curved relationship.

Figure 13:
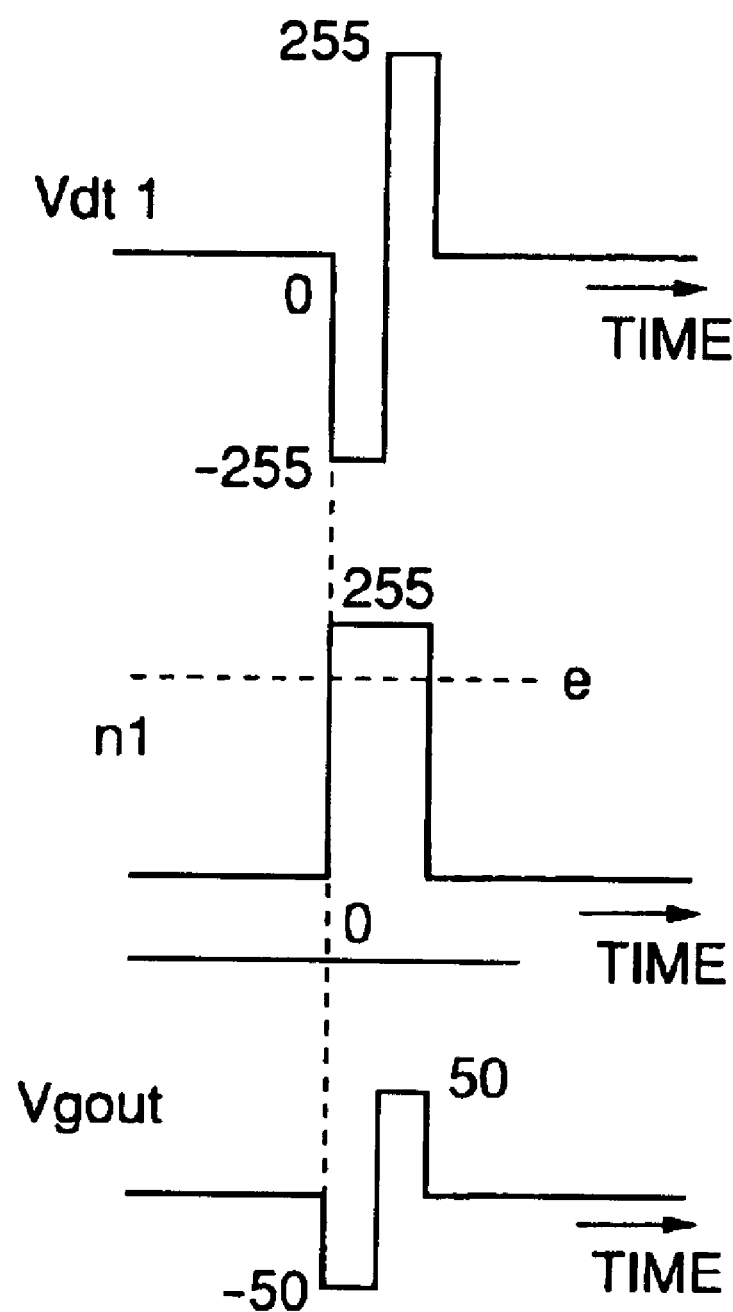
FIG. 13 is a waveform chart showing output signals from the horizontal edge signal generator, vertical edge signal generator, and vertical edge signal gain controller shown in FIG. 7.

This processing suppresses a vertical edge signal, as represented in FIG. 13 by the relationship between Vdtl serving as the output 150 from the vertical edge signal generator 111, n1 serving as the horizontal difference signal 148, and Vgout serving as the output 152 from the vertical edge signal gain controller 112. In FIG. 13, an output value given to each waveform is merely an example, and the output value can take various values with the same waveform.

After vertical edge signal suppression processing, the processed vertical edge signal 152 and a horizontal edge signal 151 whose gain is adjusted by the horizontal edge signal gain controller 110 are added by an adder 117. Then, the whole edge correction signal is output as an edge correction output d via a gain controller 113 and slice processor 114. Note that the horizontal difference signal 148 of a green signal used in the first embodiment may be used as the horizontal difference signal of a luminance signal.

Figure 14:
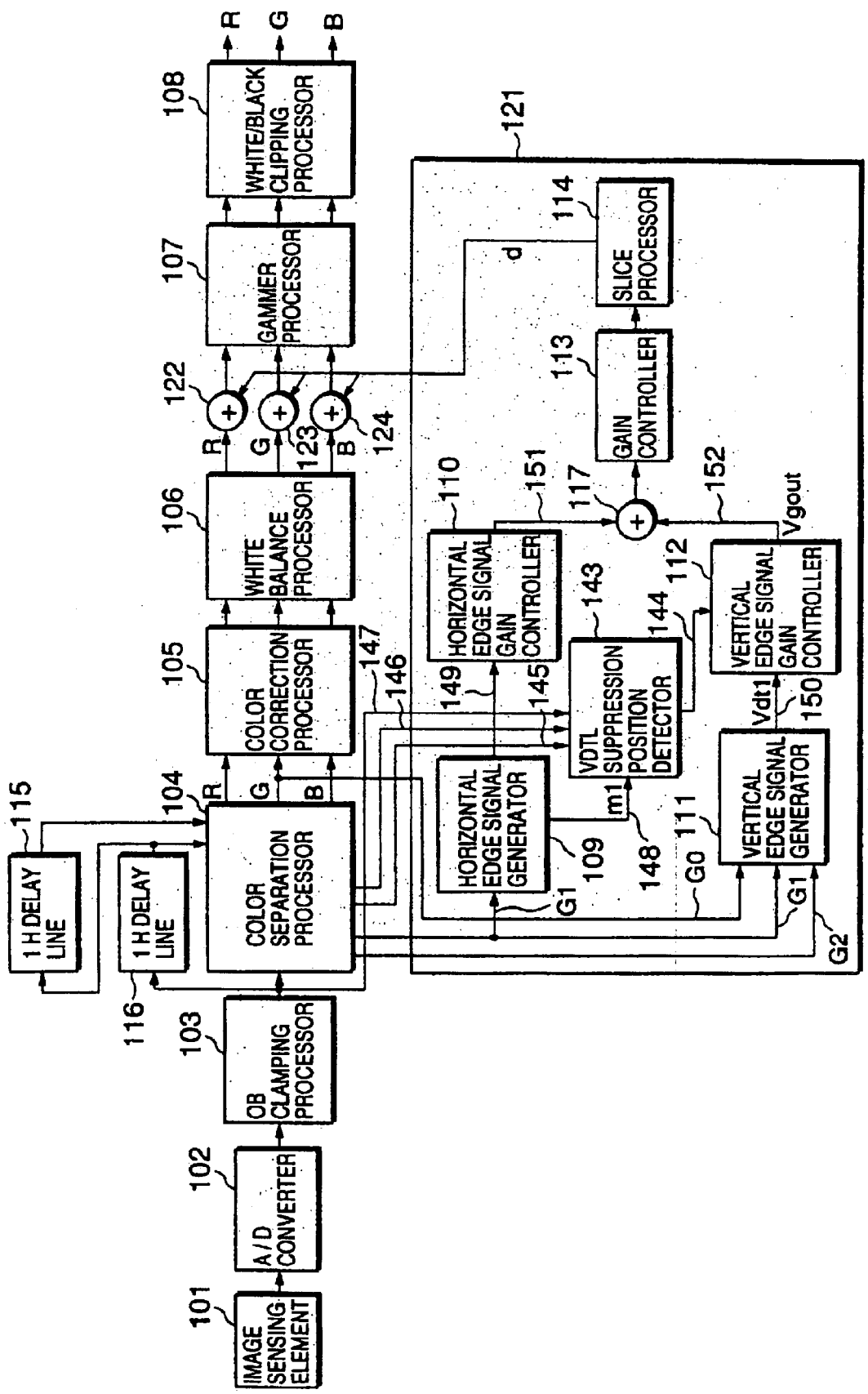
FIG. 14 is a block diagram showing an arrangement of a part related to edge correction of a CCD digital video camera according to the second embodiment of the present invention.
Figure 15:
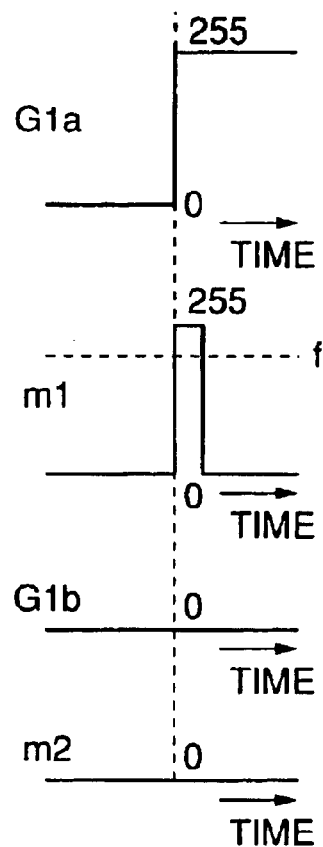
FIG. 15 is a waveform chart showing input and output signals to and from a horizontal edge signal generator shown in FIG. 14.

FIG. 14 is a block diagram showing the second embodiment of the present invention. The second embodiment is different from the embodiment in FIG. 7 in that the vertical edge component suppression position detector 141 is replaced with another vertical edge component suppression position detector 143 having a different function. In the second embodiment, a horizontal edge signal generator 109 in an edge correction processing means 121 generates a horizontal edge correction signal 149 and a horizontal difference signal 148 of a green signal. FIG. 15 shows waveforms G1a and G1b of a signal G1 input to the horizontal edge signal generator 109 and waveforms m1 and m2 of the horizontal difference signal 148 output from the horizontal edge signal generator 109. When the waveform of an input green signal abruptly changes, like the waveform G1a in FIG. 15, the horizontal difference signal 148 has a waveform with a peak, like the waveform m1. When the waveform of an input green signal is flat, like the waveform G1b in FIG. 8, the horizontal difference signal 148 also has a flat waveform, like the waveform m2. In FIG. 15, an output value given to each waveform is merely an example, and the output value can take various values with the same waveform.

If the amplitude exceeds a certain threshold f, like the waveform m1 in FIG. 15, and the difference between three vertically adjacent CCD output signals 145, 146, and 147 having undergone OB clamping processing is equal to or smaller than a given threshold, i.e., the vertical luminance difference and vertical edge component value are small around a target pixel, the vertical edge component suppression position detector 143 generates a vertical edge signal gain control signal 144, and outputs it to a vertical edge signal gain controller 112. Note that the horizontal difference signal 148 may be a signal corresponding to the luminance difference between horizontally adjacent pixels that is output from the horizontal edge signal generator 109 and the difference between digital video camera CCD output signals vertically adjacent at the same pixel position, or a signal corresponding to the output difference in green signal between horizontally adjacent pixels that is output from the horizontal edge signal generator 109 and the difference between digital video camera CCD output signals vertically adjacent at the same pixel position.

Since an unwanted vertical edge signal is generated at a position corresponding to the same pixel, as described in FIGS. 11 and 12 and "DESCRIPTION OF THE PRIOR ART", this signal is suppressed by the vertical edge signal gain controller 112 to some degree so as not to be recognized as noise on the screen. The suppression degree depends on the amplitude DS of the horizontal difference signal 148. As the amplitude exceeds the threshold f much more, the unwanted signal is suppressed more strongly. An example of this relationship is given by an equation. Letting m1 be the horizontal difference signal 140, and Kl be a coefficient used in the vertical edge component suppression position detector 143, C1 serving as the vertical edge signal gain control signal 144 is generated at the suppression position of a vertical edge signal, and given as follows:

If DS>f, and the output values of the three CCD output signals 145, 146, and 147 are equal to or smaller than a given threshold, $$C1 = K1 \cdot (m1-f) \quad (13)$$

If DS≦f, and the output values of the three CCD output signals 145, 146, and 147 are larger than a given threshold, $$C1 = 0 \quad (14)$$

Figure 16:
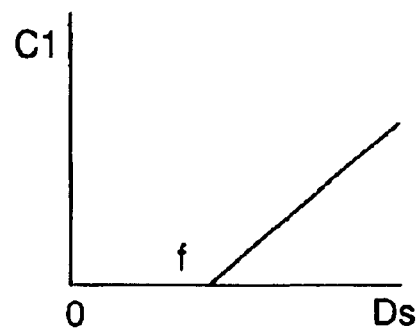
FIGS. 16 and 17 are graphs each showing a vertical edge signal gain control signal with respect to a horizontal difference signal shown in FIG. 14.
Figure 17:
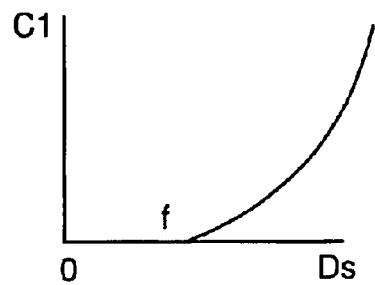

A graph representing this relationship is shown in FIG. 16, which is the same as FIG. 9 in the first embodiment except that the condition in equation (14) is added in the second embodiment. In this case, the coefficient K1 is a constant value determined under limitations on the signal bit width of the circuit, and equation (14) exhibits a linear relation. Alternatively, as shown in the graph of FIG. 17, the coefficient K1 may change depending on the magnitude of a generated unwanted vertical edge signal, and may provide a curved relationship. The threshold f can be arbitrarily set.

Letting Vdtl be an output 150 from the vertical edge signal generator 111, Vgout be an output 152 from the vertical edge signal gain controller 112, and Ks be a coefficient used in the vertical edge signal gain controller 112, Vgout is given by $$Vgout = Vdtl(1 - Ks \cdot K1 \cdot (m1-f)) \quad (15)$$

Figure 18:
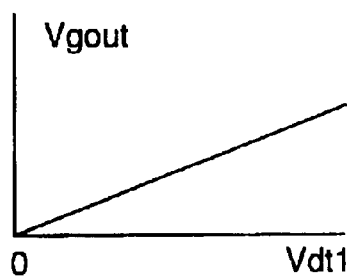
FIGS. 18 and 19 are graphs each showing the relationship between the input and output of a vertical edge signal gain controller shown in FIG. 14.
Figure 19:
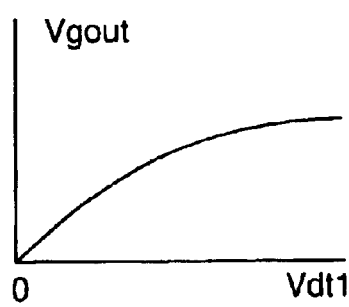

FIG. 18 shows the relationship between Vdtl and Vgout when the coefficient Ks is constant, and m1 serving as the horizontal difference signal 148 is also constant. As described above, the horizontal difference signal m1 originally changes depending on the difference in output value between horizontally adjacent pixels. This coefficient Ks is determined under limitations on the signal bit width of the circuit. Alternatively, as shown in the graph of FIG. 19, the coefficient Ks may change depending on the magnitude of a generated unwanted vertical edge signal, and may provide a curved relationship.

Figure 20:
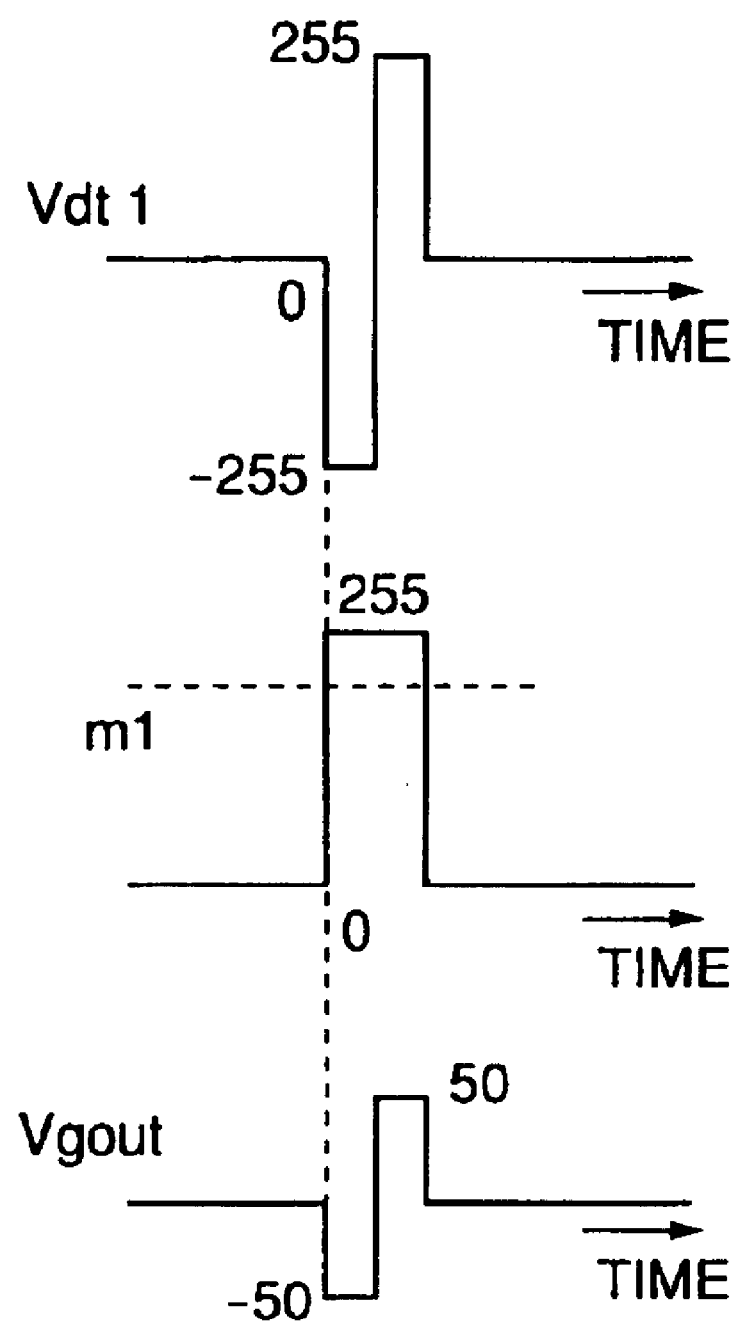
FIG. 20 is a waveform chart showing output signals from the horizontal edge signal generator, vertical edge signal generator, and vertical edge signal gain controller shown in FIG. 14.

This processing suppresses a vertical edge signal, as represented in FIG. 20 by the relationship between Vdtl serving as the output 150 from the vertical edge signal generator 111, m1 serving as the horizontal difference signal 148, and Vgout serving as the output 152 from the vertical edge signal gain controller 112. In FIG. 20, an output value given to each waveform is merely an example, and the output value can take various values with the same waveform.

In the second embodiment, the mechanism of suppressing a vertical edge signal is the same as the method in the first embodiment. In addition, the second embodiment checks three vertically adjacent CCD output signal values, and detects the suppression position of a vertical edge component on conditions under which their difference and the vertical edge component are considered to be small. Hence, the second embodiment can realize finer processing, more effectively suppress an unwanted edge correction signal, and obtain a higher-quality output image.

After vertical edge signal suppression processing, the processed vertical edge signal 152 and a horizontal edge signal 151 whose gain is adjusted by the horizontal edge signal gain controller 110 are added by an adder 117. Then, the whole edge correction signal is output as an edge correction (processed signal) output d via a gain controller 113 and slice processor 114. Note that the horizontal difference signal 148 of a green signal used in this embodiment may be used as the horizontal difference signal of a luminance signal.

What is claimed is:

1. An edge correction apparatus for a digital video camera, comprising:

a horizontal edge signal generator and a vertical edge signal generator for respectively generating horizontal and vertical edge correction signals in horizontal and vertical directions of a sensed image obtained via an image sensing element of a digital video camera;

a horizontal edge signal gain controller and a vertical edge signal gain controller for controlling gains of the horizontal and vertical edge correction signals respectively from said horizontal edge signal generator and said vertical edge signal generator;

an adder for adding the horizontal and vertical edge correction signals whose gains are controlled by said horizontal edge signal gain controller and said vertical edge signal gain controller;

a slice processor for adding, to an image processing signal of the digital video camera, an edge correction signal obtained by performing slice processing for and edge signal output from said adder; and a vertical edge component suppression position detector for causing said vertical edge signal gain controller to execute gain control of the vertical edge correction signal in accordance with a horizontal difference signal output from said horizontal edge signal generator, wherein the horizontal difference signal is a signal corresponding to a pixel value less a weighted sum of a luminance difference between horizontally adjacent pixels on opposite horizontal sides of said pixel that is output from said horizontal edge signal generator and a difference between digital video camera CCD output signals vertically adjacent on opposite vertical sides of said pixel, and wherein gain control of the vertical edge correction signal by said vertical edge signal gain controller is executed when the luminance difference between horizontally adjacent pixels is not less than a set threshold, and outputs of vertically adjacent digital video camera CCD output signals are not more than a set threshold.

2. An edge correction apparatus for a digital video camera, comprising:

a horizontal edge signal generator and a vertical edge signal generator for respectively generating horizontal and vertical edge correction signals in horizontal and vertical directions of a sensed image obtained via an image sensing element of a digital video camera;

a horizontal edge signal gain controller and a vertical edge signal gain controller for controlling gains of the horizontal and vertical edge correction signals respectively from said horizontal edge signal generator and said vertical edge signal generator;

an adder for adding the horizontal and vertical edge correction signals whose gains are controlled by said horizontal edge signal gain controller and said vertical edge signal gain controller;

a slice processor for adding, to an image processing signal of the digital video camera, an edge correction signal obtained by performing slice processing for and edge signal output from said adder; and a vertical edge component suppression position detector for causing said vertical edge signal gain controller to execute gain control of the vertical edge correction signal in accordance with a horizontal difference signal output from said horizontal edge signal generator, wherein the horizontal difference signal is a signal corresponding to a pixel value less a weighted sum of an output difference between horizontally adjacent pixels on opposite horizontal sides of said pixel that is output from said horizontal edge signal generator and a difference between digital video camera CCD output signals vertically adjacent on opposite vertical sides of said pixel, and wherein gain control of the vertical edge correction signal by said vertical edge signal gain controller is executed when the output difference in green signal between horizontally adjacent pixels is not less than a set threshold, and the difference between the vertically adjacent digital video camera CCD output signals is not more than the set threshold.

3. An edge correction apparatus for a digital video camera, comprising:

a horizontal edge signal generator and a vertical edge signal generator for respectively generating horizontal and vertical edge correction signals in horizontal and vertical directions of a sensed image obtained via an image sensing element of a digital video camera;

a horizontal edge signal gain controller and a vertical edge signal gain controller for controlling gains of the horizontal and vertical edge correction signals respectively from said horizontal edge signal generator and said vertical edge signal generator;

an adder for adding the horizontal and vertical edge correction signals whose gains are controlled by said horizontal edge signal gain controller and said vertical edge signal gain controller;

a slice processor for adding, to an image processing signal of the digital video camera, an edge correction signal obtained by performing slice processing for and edge signal output from said adder; and a vertical edge component suppression position detector for causing said vertical edge signal gain controller to execute gain control of the vertical edge correction signal in accordance with a horizontal difference signal output from said horizontal edge signal generator, wherein gain control of the vertical edge correction signal by said vertical edge signal gain controller is executed when an amplitude of the horizontal difference signal exceeds a set threshold which is greater than zero.

4. An edge correction apparatus for a digital video camera, comprising:

a horizontal edge signal generator and a vertical edge signal generator for respectively generating horizontal and vertical edge correction signals in horizontal and vertical directions of a sensed image obtained via an image sensing element of a digital video camera;

a horizontal edge signal gain controller and a vertical edge signal gain controller for controlling gains of the horizontal and vertical edge correction signals respectively from said horizontal edge signal generator and said vertical edge signal generator;

an adder for adding the horizontal and vertical edge correction signals whose gains are controlled by said horizontal edge signal gain controller and said vertical edge signal gain controller;

a slice processor for adding, to an image processing signal of the digital video camera, an edge correction signal obtained by performing slice processing for and edge signal output from said adder; and a vertical edge component suppression position detector for causing said vertical edge signal gain controller to execute gain control of the vertical edge correction signal in accordance with a horizontal difference signal output from said horizontal edge signal generator, wherein the horizontal difference signal is a signal corresponding to a luminance difference between horizontally adjacent pixels that is output from said horizontal edge signal generator and, wherein gain control of the vertical edge correction signal by said vertical edge signal gain controller is executed when the luminance difference between horizontally adjacent pixels is not less than a set threshold which is greater than zero.

5. An edge correction apparatus for a digital video camera, comprising:

a horizontal edge signal generator and a vertical edge signal generator for respectively generating horizontal and vertical edge correction signals in horizontal and vertical directions of a sensed image obtained via an image sensing element of a digital video camera;

a horizontal edge signal gain controller and a vertical edge signal gain controller for controlling gains of the horizontal and vertical edge correction signals respectively from said horizontal edge signal generator and said vertical edge signal generator;

an adder for adding the horizontal and vertical edge correction signals whose gains are controlled by said horizontal edge signal gain controller and said vertical edge signal gain controller;

a slice processor for adding, to an image processing signal of the digital video camera, an edge correction signal obtained by performing slice processing for and edge signal output from said adder; and a vertical edge component suppression position detector for causing said vertical edge signal gain controller to execute gain control of the vertical edge correction signal in accordance with a horizontal difference signal output from said horizontal edge signal generator, wherein the horizontal difference signal is a signal corresponding to an output difference in green signal between horizontally adjacent pixels that is output from said horizontal edge signal generator and, wherein gain control of the vertical edge correction signal by said vertical edge signal gain controller is executed when the output difference in green signal between horizontally adjacent pixels is not less than a set threshold which is greater than zero.

* * * * *